United States Patent
Kageyama et al.

(10) Patent No.: US 11,059,371 B2
(45) Date of Patent: Jul. 13, 2021

(54) ON-VEHICLE POWER SUPPLY DEVICE AND VEHICLE HAVING ON-VEHICLE POWER SUPPLY DEVICE MOUNTED THEREON

(71) Applicant: Panasonic Intellectual Property Management Co., Ltd., Osaka (JP)

(72) Inventors: Youichi Kageyama, Fukushima (JP); Katsunori Atago, Fukushima (JP); Kazuo Takenaka, Fukushima (JP); Hisao Hiragi, Saitama (JP); Yugo Setsu, Fukushima (JP); Takashi Higashide, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 187 days.

(21) Appl. No.: 16/491,481

(22) PCT Filed: Mar. 16, 2018

(86) PCT No.: PCT/JP2018/010497
§ 371 (c)(1),
(2) Date: Sep. 5, 2019

(87) PCT Pub. No.: WO2018/180606
PCT Pub. Date: Oct. 4, 2018

(65) Prior Publication Data
US 2020/0016981 A1  Jan. 16, 2020

(30) Foreign Application Priority Data
Mar. 27, 2017  (JP) .............................. JP2017-061044

(51) Int. Cl.
*B60L 3/00* (2019.01)
*B60L 50/60* (2019.01)
(Continued)

(52) U.S. Cl.
CPC ............. *B60L 3/0046* (2013.01); *B60L 50/60* (2019.02); *B60L 53/62* (2019.02); *B60R 21/013* (2013.01)

(58) Field of Classification Search
CPC ........ B60L 3/0046; B60L 50/60; B60L 53/62; B60R 21/013; B60R 16/03; Y02T 90/12;
(Continued)

(56) References Cited

U.S. PATENT DOCUMENTS 10,992,169 B2 * 4/2021 Fukae ............... H02J 7/007182
2014/0152108 A1 * 6/2014 Takabatake ............ B60L 15/20
307/64
(Continued)

FOREIGN PATENT DOCUMENTS

WO  2013/125170  8/2013

OTHER PUBLICATIONS

International Search Report of PCT application No. PCT/JP2018/010497 dated Jun. 19, 2018.

*Primary Examiner* — Nha T Nguyen
(74) *Attorney, Agent, or Firm* — McDermott Will and Emery LLP

(57) ABSTRACT

An on-vehicle power supply device according to the present disclosure includes an electricity storage, a charge circuit, a discharge circuit, an input unit, an output unit and a controller. When the controller decides that an emergency operation condition is satisfied, the controllers causes the charge circuit to stop charging power to the electricity storage, then sets an output instruction voltage that is a target voltage value of an output of the discharge circuit to a first voltage value, the controller further causes the discharge circuit to discharge the power charged in the electricity storage, and, when the power output from the discharge circuit becomes higher than a power threshold, the controller
(Continued)

lowers an output instruction voltage from a first voltage value to a second voltage value.

9 Claims, 12 Drawing Sheets

(51) Int. Cl.
 *B60L 53/62* (2019.01)
 *B60R 21/013* (2006.01)
(58) Field of Classification Search
 CPC ........ Y02T 10/7072; Y02T 10/70; H02J 7/00;
 H02J 7/34; H02J 9/06
 See application file for complete search history.

(56) References Cited

U.S. PATENT DOCUMENTS

| | | | | |
|---|---|---|---|---|
| 2014/0309827 | A1* | 10/2014 | Kanzaki | B60L 3/00 701/22 |
| 2015/0001926 | A1* | 1/2015 | Kageyama | E05B 81/86 307/10.1 |
| 2015/0088384 | A1* | 3/2015 | Darraba | H02P 7/04 701/45 |
| 2015/0298551 | A1* | 10/2015 | Oi | B60L 3/003 318/3 |
| 2016/0153216 | A1* | 6/2016 | Funahashi | E05B 81/56 292/2 |
| 2018/0222323 | A1* | 8/2018 | Ikeyama | B60L 3/0007 |

* cited by examiner

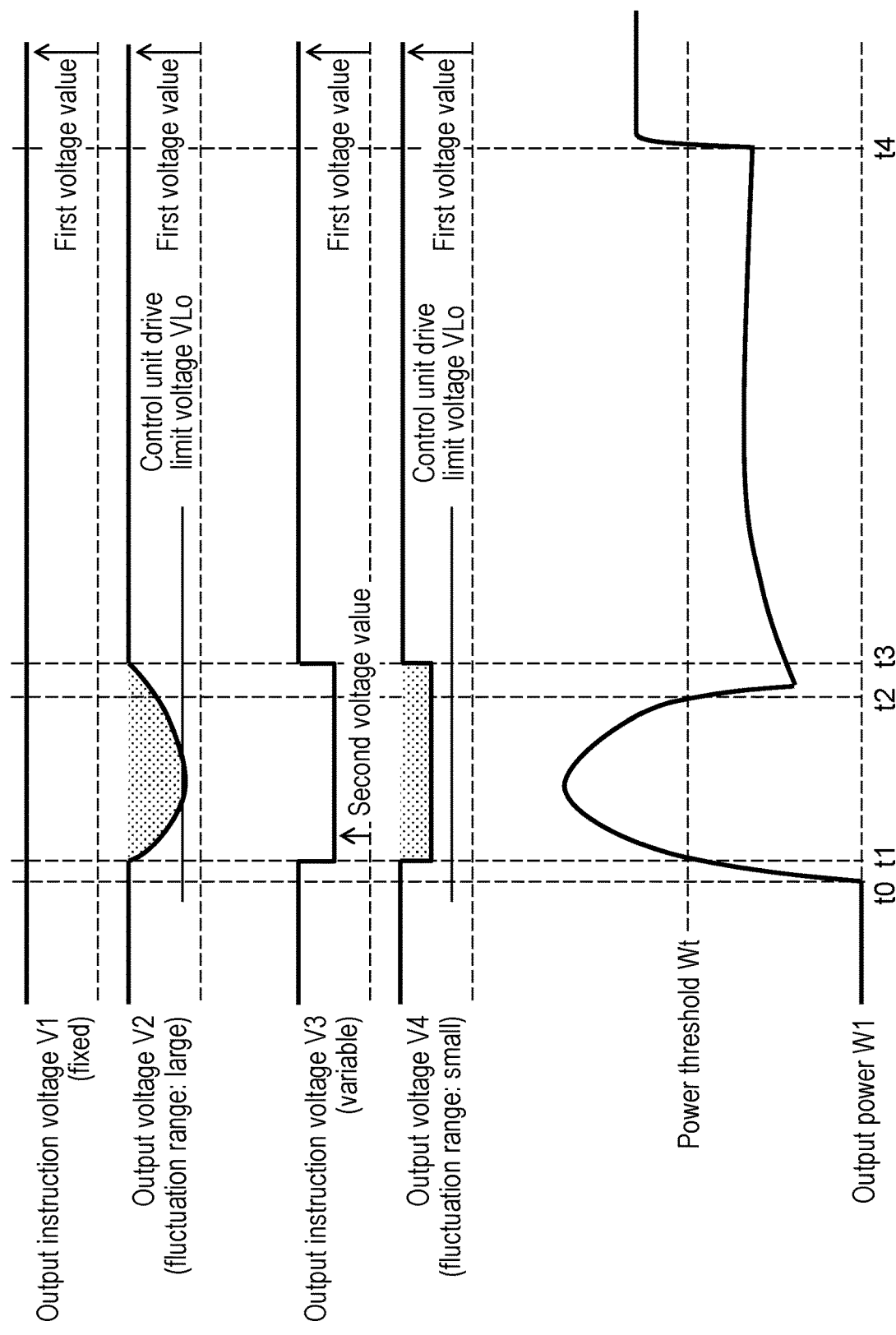

ON-VEHICLE POWER SUPPLY DEVICE AND VEHICLE HAVING ON-VEHICLE POWER SUPPLY DEVICE MOUNTED THEREON

CROSS-REFERENCE TO RELATED APPLICATIONS

This application is a U.S. national stage application of the PCT International Application No. PCT/JP2018/010497 filed on Mar. 16, 2018, which claims the benefit of foreign priority of Japanese patent application No. 2017-061044 filed on Mar. 27, 2017, the contents all of which are incorporated herein by reference.

TECHNICAL FIELD

The present disclosure relates to an on-vehicle power supply device and an on-vehicle power supply device vehicle.

BACKGROUND ART

A conventional on-vehicle power supply device will be described below with reference to the drawings. FIG. 9 is a circuit block diagram illustrating a configuration of the conventional on-vehicle power supply device, and output unit 30 of on-vehicle power supply device 1 is connected with load 2. On-vehicle power supply device 1 includes electricity storage element 3, auxiliary electricity storage element 4 and switch unit 5. Electricity storage element 3 is connected with output unit 30 via switch unit 5, and auxiliary electricity storage element 4 is connected with an output of switch unit 5. That is, auxiliary electricity storage element 4 is connected with output unit 30. When the voltage of electricity storage element 3 is normal, switch unit 5 causes electricity storage element 3 to supply power to load 2. Simultaneously, switch unit 5 operates such that electricity storage element 3 charges auxiliary electricity storage element 4.

On the other hand, when the voltage of electricity storage element 3 lowers, switch unit 5 discharges power of auxiliary electricity storage element 4 and superimposes the voltage of auxiliary electricity storage element 4 on the voltage of electricity storage element 3. Both of electricity storage element 3 and auxiliary electricity storage element 4 supply power to load 2. According to this configuration, even when the voltage of electricity storage element 3 lowers, on-vehicle power supply device 1 can supply power to load 2 at a stable voltage.

It should be noted that, for example, PTL 1 is known as a prior art document containing information related to this application.

CITATION LIST

Patent Literature

PTL 1: PCT International Publication No. 2013/125170

SUMMARY OF THE INVENTION

An on-vehicle power supply device according to one aspect of the present disclosure includes: an electricity storage; a charge circuit that is provided on a charging route of the electricity storage, and charges the electricity storage with power; a discharge circuit that is provided on an output route of the electricity storage, and discharges the power of the electricity storage; an input unit that is connected with the charge circuit; an output unit that is connected with the discharge circuit; and a controller that detects an input voltage of the input unit, an output current of the output unit, and an output voltage of the output unit, and controls the charge circuit and the discharge circuit, and, when the controller decides that an emergency operation condition is satisfied, the controllers causes the charge circuit to stop charging the power to the electricity storage, then sets an output instruction voltage that is a target voltage value of an output of the discharge circuit to a first voltage value, the controller further causes the discharge circuit to discharge the power charged in the electricity storage, and, when the power output from the discharge circuit becomes higher than a power threshold, the controller lowers the output instruction voltage from the first voltage value to a second voltage value.

Furthermore, a vehicle according to the present disclosure includes: the on-vehicle power supply device according to the above one aspect; a vehicle body on which the on-vehicle power supply device is mounted; and a vehicle battery that is mounted on the vehicle body and supplies power to the on-vehicle power supply device.

BRIEF DESCRIPTION OF DRAWINGS

FIG. 4 is a timing chart for explaining the operation of the on-vehicle power supply device according to the first exemplary embodiment of the present disclosure.

DESCRIPTION OF EMBODIMENTS

Figure 9:
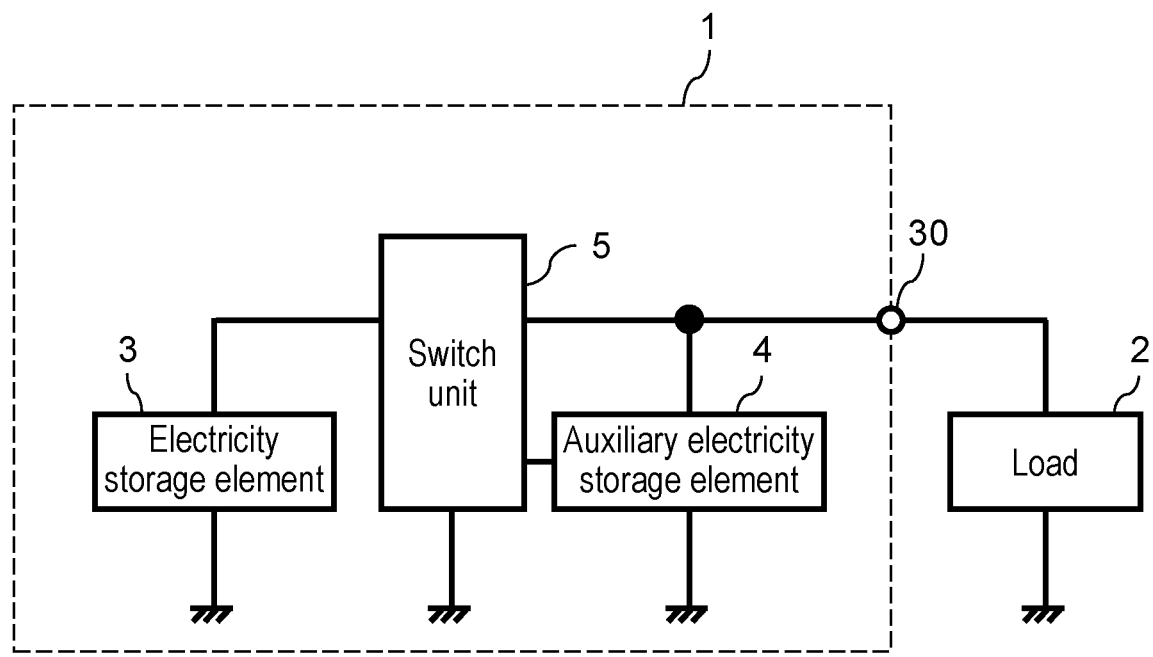
FIG. 9 is a circuit block diagram illustrating a conventional on-vehicle power supply device.

On-vehicle power supply device 1 described with reference to FIG. 9 needs to include auxiliary electricity storage element 4 that makes up for a decrease when the voltage of electricity storage element 3 decreases. Hence, a number of elements that make up on-vehicle power supply device 1 increases. As a result, on-vehicle power supply device 1 becomes large.

On-vehicle power supply device 6 according to the present disclosure described below can stably operate, and realize miniaturization.

First Exemplary Embodiment

The first exemplary embodiment of the present disclosure will be described below with reference to the drawings.

Figure 1:
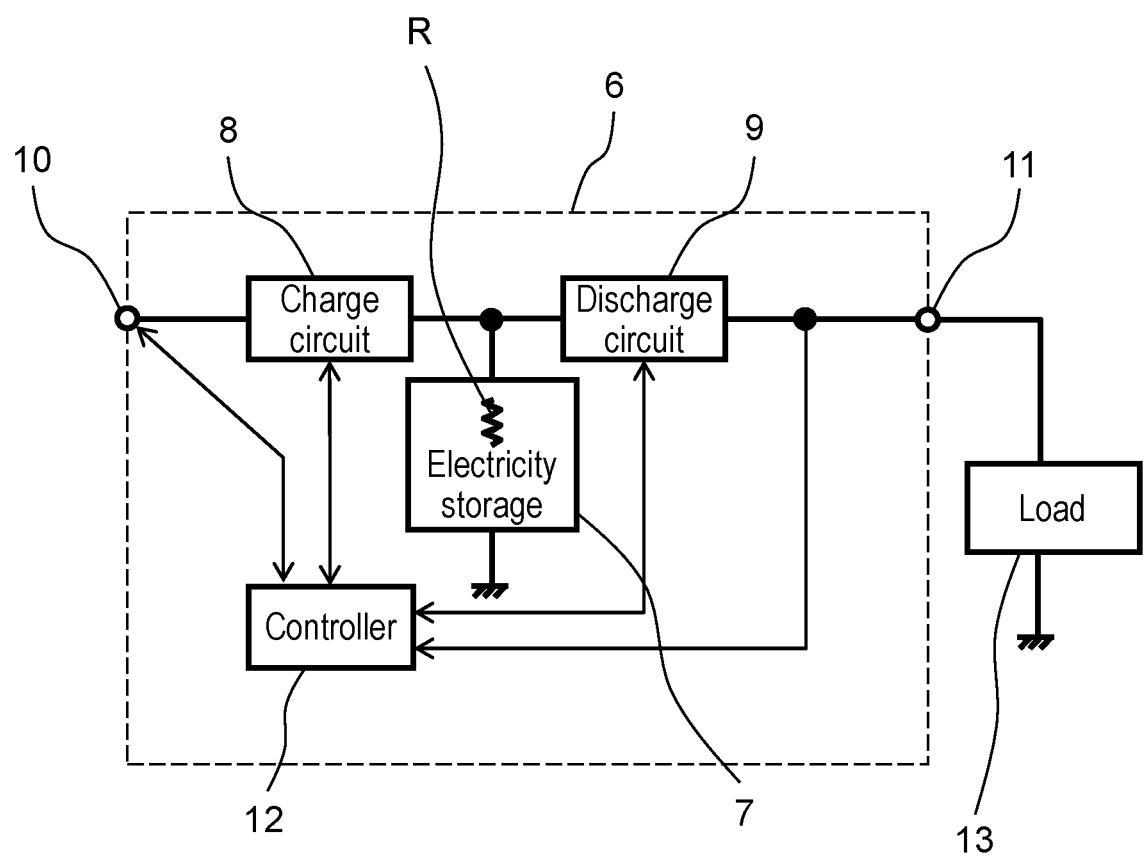
FIG. 1 is a circuit block diagram illustrating a configuration of an on-vehicle power supply device according to a first exemplary embodiment of the present disclosure.

FIG. 1 is a circuit block diagram illustrating a configuration of on-vehicle power supply device 6 according to the first exemplary embodiment of the present disclosure. On-vehicle power supply device 6 includes electricity storage 7, charge circuit 8, discharge circuit 9, input unit 10, output unit 11 and controller 12.

Charge circuit 8 is provided on a charging route of electricity storage 7, and can charge electricity storage 7 with power. Discharge circuit 9 is provided on an output route of electricity storage 7, and discharges the power of electricity storage 7. Input unit 10 is connected with charge circuit 8, and output unit 11 is connected with discharge circuit 9. Controller 12 detects an input voltage of input unit 10, an output current of output unit 11 and an output voltage of output unit 11, and controls operations of charge circuit 8 and discharge circuit 9.

FIG. 1 illustrates power supply routes as bold lines, and signal transmission routes as thin lines. For example, the power supply route which connects input unit 10 and charge circuit 8 is illustrated as the bold line, and the signal transmission route which connects input unit 10 and controller 12 is illustrated as a thin line. However, whether power transmitted through the power supply routes or the signal transmission routes is high or low is just an indication, and each of the bold lines and the thin lines is electrically connected likewise.

When controller 12 detects that an input voltage of input unit 10 is more than or equal to an input lower limit voltage, controller 12 decides that normal operation conditions are satisfied. Furthermore, controller 12 controls charge circuit 8 such that charge circuit 8 continuously or intermittently charges electricity storage 7 in order that output unit 11 reaches a predetermined electricity storage voltage. A state where the input voltage is more than or equal to the input lower limit voltage will be referred to as a "normal mode" below.

On the other hand, when controller 12 detects that the input voltage is lower than the input lower limit voltage, controller 12 decides that emergency operation conditions are satisfied. Furthermore, controller 12 performs control to cause charge circuit 8 to stop charging electricity storage 7, and then discharge power from electricity storage 7 to discharge circuit 9. In this case, controller 12 instructs an output instruction voltage which is a target voltage value of an output of discharge circuit 9 to discharge circuit 9, and starts discharging power from electricity storage 7 to discharge circuit 9. The output instruction voltage in this case is a "first voltage value". A state where the input voltage is lower than the input lower limit voltage will be referred to as an "emergency power supply mode" below. Subsequently, when output power of the output current and the output voltage is more than or equal to a power threshold, controller 12 instructs discharge circuit 9 to lower the output instruction voltage from the first voltage value to the second voltage value. Details of a change in the voltage will be described below with reference to FIG. 4.

As described above, when large output power is necessary in the emergency power supply mode, on-vehicle power supply device 6 lowers the output instruction voltage from the first voltage value to the second voltage value. According to this configuration, temporary pulsation of a voltage which occurs as the output power reaches a supply limit, in other words, temporary pulsation of a voltage which occurs due to an influence from load 13 connected with output unit 11 is suppressed. Consequently, a fluctuation of a high output voltage is alleviated. On-vehicle power supply device 6 can output a stable voltage without additionally providing an auxiliary electricity storage element (e.g., electricity storage element 3 illustrated in FIG. 9). As a result, on-vehicle power supply device 6 can stably operate, and realize miniaturization at the same time.

Figure 2:
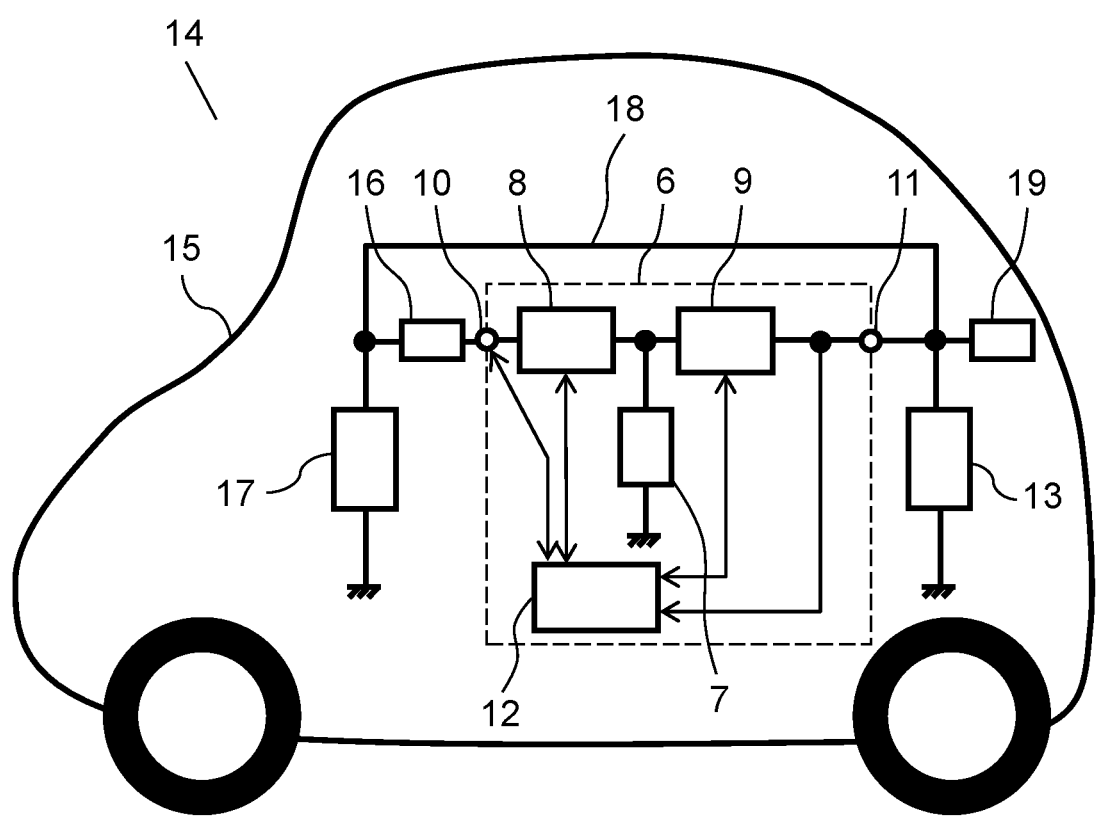
FIG. 2 is a circuit block diagram illustrating a configuration of a vehicle on which the on-vehicle power supply device according to the first exemplary embodiment of the present disclosure is mounted.
Figure 3A:
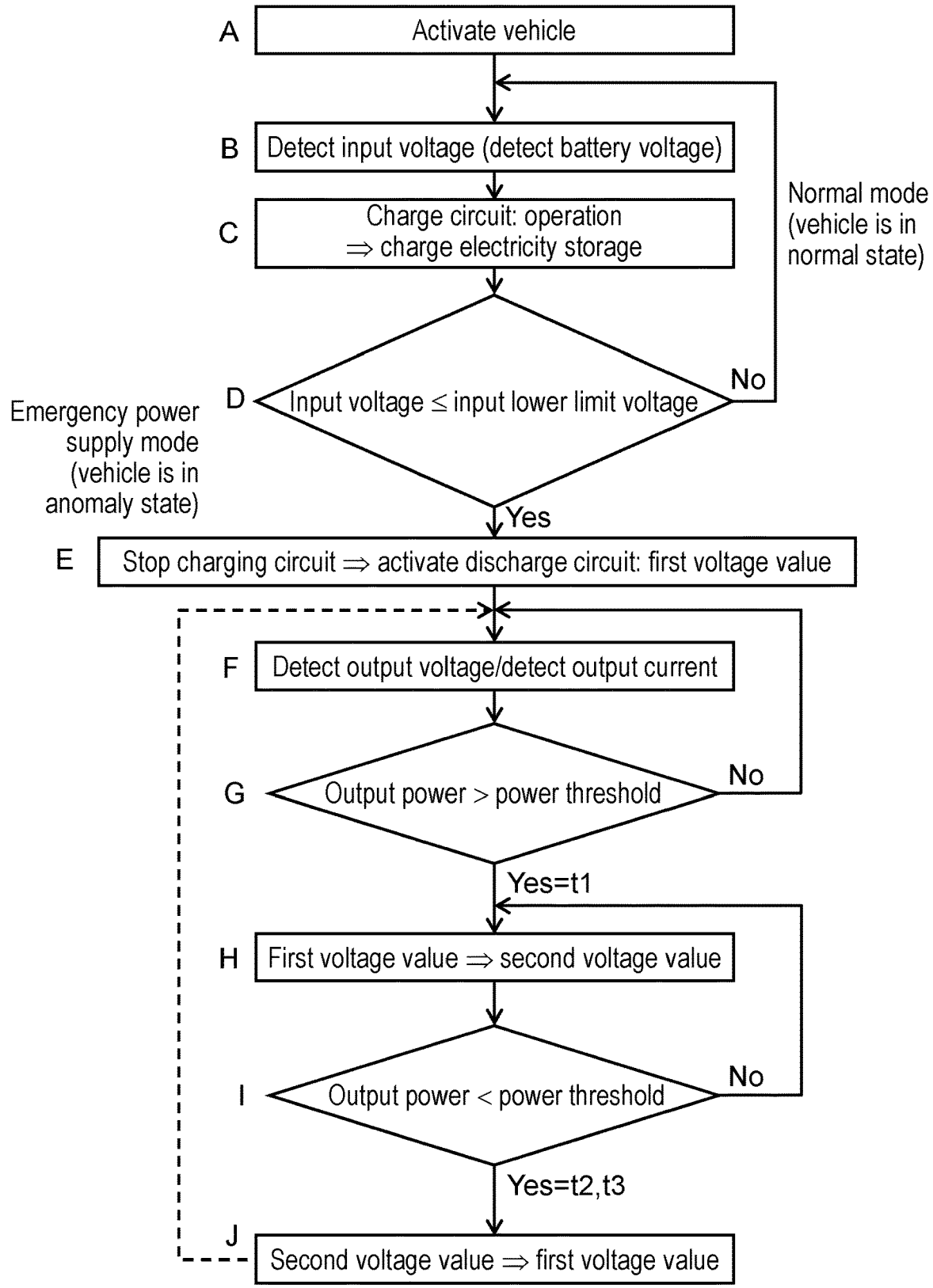
FIG. 3A is a flowchart for explaining an operation of the on-vehicle power supply device according to the first exemplary embodiment of the present disclosure.

Next, details of a configuration and an operation of on-vehicle power supply device 6 will be described with reference to the drawings. FIG. 2 is a block diagram illustrating a configuration of vehicle 14 on which on-vehicle power supply device 6 according to the first exemplary embodiment of the present disclosure is mounted. FIG. 3A is a flowchart for explaining the operation of on-vehicle power supply device 6 according to the first exemplary embodiment of the present disclosure, and FIG. 4 is a timing chart for explaining the operation of on-vehicle power supply device 6 according to the first exemplary embodiment of the present disclosure.

As illustrated in FIG. 2, on-vehicle power supply device 6 is disposed in vehicle 15 which makes up vehicle 14. Input unit 10 is connected with vehicle battery 17 via switch 16. Furthermore, output unit 11 is connected with load 13. Furthermore, vehicle battery 17 is connected with load 13 via transmission line 18. In addition, on-vehicle power supply device 6 has already been described with reference to FIG. 1, and therefore description of on-vehicle power supply device 6 will be omitted.

When a passenger gets on vehicle 14 and turns on or off an activation switch (not illustrated) for activating vehicle 14, switch 16 is turned on or off. Furthermore, when the passenger switches switch 16 from off to on, vehicle 14 is activated, and switch 16 enters a connection state. Furthermore, controller 12 of on-vehicle power supply device 6 is also activated. The above corresponds to step A in the flowchart in FIG. 3A.

Next, controller 12 is connected with input unit 10, and detects the input voltage of input unit 10 at all times. In addition, by connecting controller 12 with charge circuit 8 and detecting the input voltage of charge circuit 8, the input voltage of input unit 10 may be detected. That controller 12 detects the input voltage of input unit 10 means that controller 12 detects the voltage of vehicle battery 17. Furthermore, when controller 12 detects a voltage of vehicle battery 17, controller 12 activates charge circuit 8. Furthermore, charge circuit 8 continuously or intermittently charges electricity storage 7 to a predetermined electricity storage voltage. The above corresponds to step B and step C in the flowchart in FIG. 3A.

In addition, although the present exemplary embodiment has described charge circuit 8 and input unit 10 as individual elements, charge circuit 8 may include input unit 10.

In addition, according to the present exemplary embodiment, controller 12 detects the voltage of vehicle battery 17, and then charge circuit 8 charges electricity storage 7. However, an order of these operations may be reverse.

Furthermore, if vehicle battery 17 is in an anomaly state during activation of vehicle 14, vehicle 14 is not normally activated. Hence, when vehicle 14 is not normally activated, on-vehicle power supply device 6 is not activated, either. The operation of on-vehicle power supply device 6 described below is an operation performed when vehicle battery 17 is in a normal state at a point of time at which vehicle 14 is activated. Furthermore, the operation of on-vehicle power supply device 6 described below is performed in a state where, after vehicle 14 is normally activated, vehicle 14 is being normally driven or can be driven.

Next, step D will be described. Controller 12 compares the input lower limit voltage and the input voltage by using the input voltage detected in step B. A value which cannot be taken while vehicle 14 normally operates is set to the input lower limit voltage. The input lower limit voltage may be set assuming a state where, for example, vehicle 14 causes a collision accident, and vehicle battery 17 becomes defective. In other words, the input lower limit voltage can be set to a value close to a low value such as 0 V to several V at which control unit 19 which controls entire vehicle 14 and load 13 cannot operate.

When the input voltage takes a value larger than the input lower limit voltage, controller 12 decides that vehicle 14 or vehicle battery 17 is in the normal state without encountering an accident, and the operation returns to step B. When controller 12 detects the input voltage and compares and decides the input voltage and the input lower limit voltage at all times while vehicle 14 is in an activated state. The above corresponds to "No" in step D in the flowchart in FIG. 3A.

In addition, while controller 12 decides that vehicle 14 and vehicle battery 17 are normal, discharge circuit 9 does not basically operate load 13. Discharge circuit 9 is connected with controller 12, and controller 12 controls an operation of discharge circuit 9. There is a case where, while controller 12 decides that vehicle 14 and vehicle battery 17 are normal, discharge circuit 9 operates to temporarily adjust an electricity storage amount of electricity storage 7. In this case, discharge circuit 9 only outputs weak power compared to a capacity of power which electricity storage 7 can store, and this weak power does not influence the operation of load 13. Furthermore, when controller 12 decides that vehicle 14 and vehicle battery 17 are normal, power is supplied to control unit 19 and load 13 from vehicle battery 17 via transmission line 18. The present exemplary embodiment makes connection which enables power supply to load 13 from vehicle battery 17 at all times. However, load 13 actually includes a plurality of various loads. Hence, a load switch (not illustrated) which interlocks with switch 16 may be provided between vehicle battery 17 and load 13.

Repetition of step B, step C and step D in FIG. 3A described herein is a normal mode, and is an operation in a case where vehicle 14 and vehicle battery 17 are normal as described above.

Next, an operation in a case where the processing proceeds from step D to step E will be described. A case where the processing proceeds to step E will be described as an "emergency power supply mode" in the present exemplary embodiment.

Controller 12 compares the input lower limit voltage and the input voltage by using the input voltage detected in step B. When the input voltage takes a value less than or equal to the input lower limit voltage, controller 12 decides that vehicle 14 and vehicle battery 17 encounter an accident and are in an anomaly state ("emergency power supply mode"). This corresponds to "Yes" in step D in the flowchart of FIG. 3A.

When controller 12 decides that the input voltage takes the value less than or equal to the input lower limit voltage even though switch 16 is in a connected state (even though vehicle 14 is in an activated state), and controller 12 performs following control as the emergency power supply mode.

First, when controller 12 decides in step D that the input voltage takes the value less than or equal to the input lower limit voltage, controller 12 causes charge circuit 8 to stop charging electricity storage 7. Subsequently, controller 12 places discharge circuit 9 in a dischargeable state, and controls discharge circuit 9 to perform a discharging operation to drive load 13. When controller 12 decides that the input voltage takes the value less than or equal to the input lower limit voltage, discharge circuit 9 immediately performs the discharging operation.

Figure 3B:
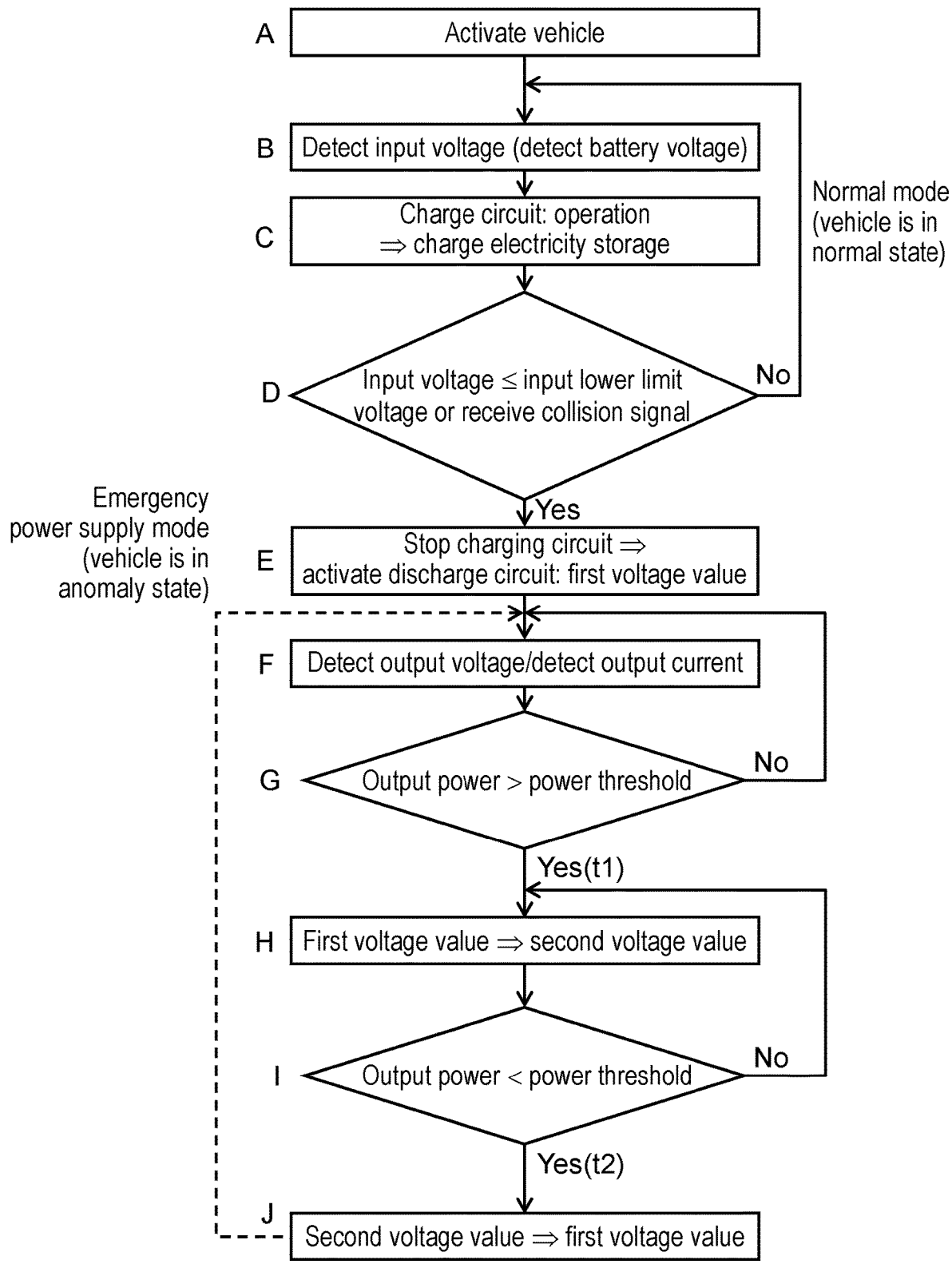
FIG. 3B is a flowchart for explaining an operation of an on-vehicle power supply device according to a second exemplary embodiment of the present disclosure.

In addition, although the discharging operation of discharge circuit 9 is started when it is decided that the input voltage takes the value less than or equal to the input lower limit voltage in the present exemplary embodiment, the discharging operation of discharge circuit 9 may be performed in response to that controller 12 receives from an outside a signal for causing discharge circuit 9 to operate as indicated in step D in FIG. 3B. As one example of a received signal from the outside in FIG. 3B, a collision signal is used.

In this regard, a target voltage value of the voltage which is output by discharge circuit 9 to drive load 13 will be referred to as an "output instruction voltage". Controller 12 sets the output instruction voltage to the first voltage value. Furthermore, discharge circuit 9 discharges power stored in electricity storage 7 such that the output instruction voltage is the first voltage value. Although not illustrated in FIGS. 1 and 2, power for operating controller 12 is supplied from electricity storage 7 or discharge circuit 9 in the emergency power supply mode.

Furthermore, when controller 12 decides that the input voltage takes the value less than or equal to the input lower limit voltage to maintain the functions of controller 12 and control unit 19, discharge circuit 9 supplies a predetermined voltage to controller 12 and control unit 19 with small power compared to power immediately supplied to load 13. The above corresponds to step E in the flowchart in FIG. 3A.

Next, controller 12 detects the output voltage and the output current of discharge circuit 9. In addition, controller 12 may detect the output voltage and the output current of output unit 11 instead of an output of discharge circuit 9. In other words, controller 12 detects power (referred to as "output power" below) supplied to load 13. In this regard, the power supplied to load 13 may be calculated by controller 12 by a product of the output voltage and the output current of discharge circuit 9 (or a product of the output voltage and the output current of output unit 11). The above corresponds to step F in the flowchart in FIG. 3A. In this regard, although discharge circuit 9 and output unit 11 have been described as different components, discharge circuit 9 may include output unit 11.

Next, controller 12 compares the power threshold and the output power by using the output voltage and the output current detected in step F. The power threshold is determined based on a maximum electricity storage amount of electricity storage 7, and a discharge time taken to supply power from discharge circuit 9 to load 13. In addition, a power threshold determining method is not limited to this. The above corresponds to step F in the flowchart in FIG. 3A.

When the output power is less than or equal to the power threshold in step G, controller 12 instructs discharge circuit 9 to continuously operate by using the output instruction voltage as the first voltage value ("No" in step G).

On the other hand, when the output power is higher than the power threshold, controller 12 instructs discharge circuit 9 to lower the output instruction voltage from the first voltage value to the second voltage value. This corresponds to G and step H in the flowchart in FIG. 3A.

Hereinafter, a case where controller 12 instructs discharge circuit 9 to maintain output instruction voltage V1 at the first voltage value, and a case where output instruction voltage V3 is changed from the first voltage value to output voltage V2 will be compared with reference to FIG. 4.

FIG. 4 illustrates a change of output voltage V2 in a case where controller 12 instructs discharge circuit 9 to maintain output instruction voltage V1 at the first voltage value. Furthermore, FIG. 4 illustrates a change of output voltage V4 in a case where controller 12 instructs discharge circuit 9 to lower output instruction voltage V3 from the first voltage value to the second voltage value. Furthermore, FIG. 4 illustrates a change of output power W1 from output unit 11, too.

Hereinafter, an example where load 13 is an electric motor will be described. As indicated by W1 in FIG. 4, discharge circuit 9 starts supplying power to load 13 at a timing of t0 to activate load 13 (electric motor). At a timing from t0 to t2, the operation of load 13 is not in a stationary state. That is, between t0 and t2, i.e., until the electric motor starts rotating at a constant speed after receiving a supply of power, a large current temporarily flows to load 13. Furthermore, there is a limit of power that can be supplied to load 13 by electricity storage 7 and discharge circuit 9.

Hence, when control is performed to instruct discharge circuit 9 to maintain output instruction voltage V1 at the first voltage value as illustrated in FIG. 4, and a large current flows to instantaneously supply high power to load 13, if the value of the output current of discharge circuit 9 becomes too large, discharge circuit 9 continues operating in a state where discharge power is maintained. Hence, to maintain the discharge power, output voltage V2 of discharge circuit 9 temporarily lowers substantially in some cases. That is, output voltage V2 output from discharge circuit 9 and detected by output unit 11, and output instruction voltage V1 instructed to discharge circuit 9 by controller 12 take different values, and output voltage V2 becomes lower than output instruction voltage V1.

A decrease in output voltage V2 of discharge circuit 9 is a temporary phenomenon. Even when output power W1 temporarily increases, output power W1 decreases in the end, and, as output power W1 decreases, output voltage V2 returns to match with the first voltage value.

However, in the emergency power supply mode that on-vehicle power supply device 6 is activated, discharge circuit 9 needs to supply a stable voltage to control unit 19 and controller 12 in some cases. Hence, the output voltage of discharge circuit 9 in the emergency power supply mode needs to maintain a higher voltage at all times than control unit drive limit voltage VLo (referred to as limit voltage VLo below). When controller 12 controls discharge circuit 9 to maintain output instruction voltage V1 at the first voltage value irrespective of such a restriction, it is likely that output voltage V2 of discharge circuit 9 temporarily lowers substantially to maintain the discharge power, and output voltage V2 lowers to a value lower than limit voltage VLo.

Hereinafter, a case where, at t1 which is a timing at which the output power becomes larger than power threshold Wt, controller 12 performs control to cause discharge circuit 9 to lower output instruction voltage V3 from the first voltage value to the second voltage value will be described. In this case, too, a large current flows from output unit 11 to supply high power to load 13. Furthermore, if the value of the output current of discharge circuit 9 becomes too large, discharge circuit 9 continues operating in a state where discharge power is maintained. Hence, to maintain discharge power, output voltage V4 of discharge circuit 9 is concerned to temporarily lower. However, output instruction voltage V3 is lowered to the second voltage value, and therefore a permitted amount of the output current in discharge circuit 9 becomes large. Hence, even when a large current instantaneously flows to load 13, a decrease amount of output voltage V4 of discharge circuit 9 caused by the large current is substantially suppressed. Consequently, output voltage V4 of discharge circuit 9 easily maintains a higher voltage than limit voltage VLo. As a result, even in the emergency power supply mode that on-vehicle power supply device 6 is activated, discharge circuit 9 can supply a stable voltage to control unit 19 and controller 12. Naturally, the second voltage value is a higher voltage value than limit voltage VLo.

In a timing chart in FIG. 4, a region in which the output voltage of discharge circuit 9 temporarily lowers substantially due to control for maintaining output instruction voltage V1 of discharge circuit 9 at the first voltage value is indicated by hatching output voltage V2. A region in which output voltage V4 of discharge circuit 9 temporarily lowers substantially due to control for lowering output instruction voltage V3 of discharge circuit 9 from the first voltage value to the second voltage value is indicated by hatching output voltage V4. These hatched areas substantially correspond to an insufficient power amount of output power W1 in discharge circuit 9. Hence, the area of the hatched region indicating output voltage V2 which changes according to load 13, and the area of the hatched region indicating output voltage V4 which is set by changing standards of output instruction voltage V3 are matched substantially. In other words, a value obtained by integrating the insufficient voltage, and a value obtained by integrating a value obtained by lowering the standards of the output instruction voltage may be matched substantially. Consequently, even when the large current instantaneously flows to load 13, it is possible to substantially prevent a decrease in output voltage V4 of discharge circuit 9 caused by the large current. Alternatively, even when the large current instantaneously flows to load 13, it is possible to prevent output voltage V4 of discharge circuit 9 from lowering to less than or equal to the second voltage value. The timing chart in FIG. 4 illustrates the second voltage value as a fixed value, yet is influenced by load 13 in some cases and therefore pulsates in some cases.

As described above, controller 12 performs control according to the timing chart in FIG. 4 in step G and step H in the flowchart in FIG. 3A, so that on-vehicle power supply device 6 can stably operate. That is, an auxiliary electricity storage element (e.g., auxiliary electricity storage element 4 in FIG. 9) is not provided to electricity storage 7, and electricity storage 7 and discharge circuit 9 output stable output voltage V4. Hence, on-vehicle power supply device 6 can be miniaturized.

The above description has described an aspect of an operation related to such an instruction from controller 12 to discharge circuit 9 that controller 12 lowers output instruction voltage V3 from the first voltage value to the second voltage value. By contrast with this, even if an aspect of the operation of discharge circuit 9 will be described, an operation order is the same.

It has been stated that, when, for example, output power W1 becomes larger than power threshold Wt in the emergency power supply mode as described above, "controller 12 lowers output instruction voltage V3 from the first voltage value to the second voltage value". However, these control and operation may not be performed. For example, it may be described that "control of controller 12 lowers output voltage V4 of discharge circuit 9 from the first voltage to the second voltage". Regarding replacement of description related to the control and the operation described herein, the same operation and the same control are applicable.

Furthermore, it has been stated that "controller 12 makes the output instruction voltage the first voltage value". However, this may be replaced to read that "controller 12 performs control to output the first voltage value to discharge circuit 9". In still another example, it has been described that "controller 12 makes output instruction voltage V3 the second voltage value". However, this description may be replaced to read that "controller 12 causes discharge circuit 9 to output the second voltage value".

Furthermore, FIG. 4 illustrates that, when output instruction voltage V3 lowers to the second voltage value in the emergency power supply mode, output voltage V4 shows a waveform similar to the output instruction voltage for ease of description. However, output voltage V4 may fluctuate a little in a period from t1 to t3. Output voltage V4 maintains a higher voltage than limit voltage VLo in the period from t1 to t3.

In this regard, operations in step I and step J illustrated in the flowchart in FIG. 3A may be performed. When load 13 is the electric motor as described above, a trajectory of a fluctuation of output power W1 substantially corresponds to a trajectory of a torque fluctuation of the electric motor which is load 13. Furthermore, the trajectory of output power W1 passes a maximum value and starts lowering as the time passes, and becomes lower than power threshold Wt at a timing of t2. As described below, load 13 becomes close to a stationary operation state at a timing of t3 after the timing of t2, then the torque further lowers, and output power W1 becomes lower than power threshold Wt at the timing of t3.

Output power W1 lowers when the operation (mainly rotation) of the electric motor which is load 13 enters the stationary state or becomes close to the stationary state. After the operation of load 13 enters the stationary state, large output power is not requested. Hence, at a timing at which it is possible to regard that load 13 enters the stationary state, output instruction voltage V3 to discharge circuit 9 may be returned from the second voltage value to the first voltage value. Consequently, output voltage V4 from discharge circuit 9 becomes high at all times with a margin with respect to limit voltage VLo. Consequently, discharge circuit 9 can stably supply a drive voltage to control unit 19 and controller 12.

The timing at which output instruction voltage V3 to discharge circuit 9 is returned from the second voltage value to the first voltage value may come after t2 of a timing at which output power W1 becomes smaller again than power threshold Wt used before. The timing at which output instruction voltage V3 to discharge circuit 9 is returned from the second voltage value to the first voltage value may be t3 which passes a desired period from the timing of t2. In the example illustrated in FIG. 4, output instruction voltage V3 to discharge circuit 9 is returned from the second voltage value to the first voltage value at the timing of t3. The above corresponds to step I and step J in the flowchart in FIG. 3A.

As described above, controller 12 returns output instruction voltage V3 from the second voltage value to the first voltage value in this description. That is, the operation has been described from the aspect related to the instruction of controller 12. By contrast with this, the operation may be described from the aspect related to the operation of discharge circuit 9. The control and the operation described to read that "controller 12 returns the output instruction voltage from the second voltage value to the first voltage value" may be replaced with that "the output voltage of discharge circuit 9 returns from the second voltage to the first voltage under control of controller 12".

In the timing chart in FIG. 4, the operation in the stationary state of load 13 continues by a timing of t4. Furthermore, at the timing of t4, the operation of the electric motor which is load 13 reaches a limit of an operation range. In other words, when the electric motor reaches a rotation limit from a state where the electric motor is rotating, a large current flows again to load 13, and large power is supplied. At t4 which is this timing or subsequent to t4, the main operation of on-vehicle power supply device 6 has been finished. Hence, after the timing of t4, output instruction voltage V3 does not need to be changed to other standards.

On-vehicle power supply device 6 according to the present exemplary embodiment can more accurately decide whether or not the anomaly state of vehicle 14 occurs. As a result, on-vehicle power supply device 6 can operate in the emergency power supply mode at a necessary timing.

Second Exemplary Embodiment

Next, the second exemplary embodiment will be described with reference to FIGS. 3B, 5 and 6.

Figure 5:
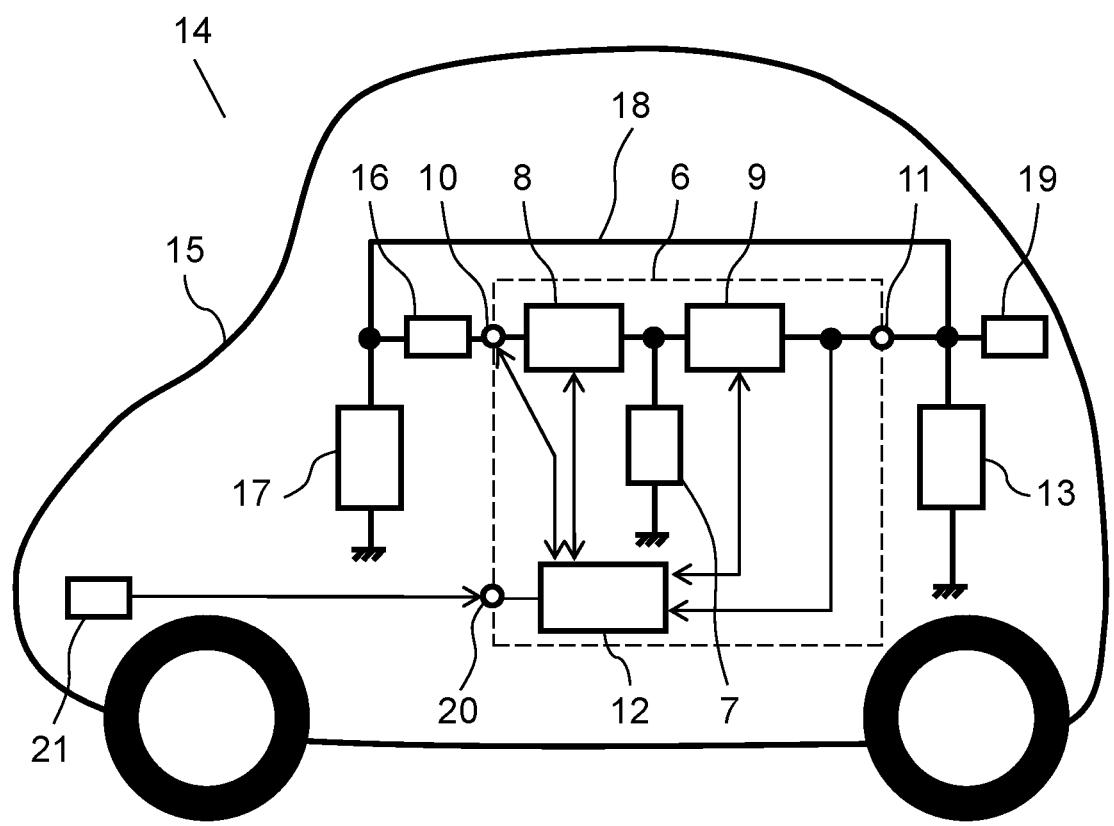
FIG. 5 is a block diagram illustrating a configuration of a vehicle on which the on-vehicle power supply device according to the second exemplary embodiment of the present disclosure is mounted.

FIG. 5 is a block diagram illustrating a configuration of vehicle 14 on which on-vehicle power supply device 6 according to the second exemplary embodiment is mounted. In addition, the same components between a configuration of vehicle 14 illustrated in FIG. 2 and the configuration of vehicle 14 illustrated in FIG. 5 will be assigned the same reference signs, and description of the components will be omitted.

FIG. 3B is a flowchart for explaining an operation of an on-vehicle power supply device according to the second exemplary embodiment. A step different between a flowchart illustrated in FIG. 3A and the flowchart illustrated in FIG. 3B is only step D.

As illustrated in FIG. 5, on-vehicle power supply device 6 is provided with collision signal receiver 20 connected with controller 12. Controller 12 detects an input voltage of input unit 10 at all times. In addition, controller 12 may detect the input voltage from charge circuit 8. Furthermore, when controller 12 detects (1) that the input voltage has become lower than an input lower limit voltage, (2) detects reception of a collision signal via collision signal receiver 20, and detects at least one of (1) and (2), in step D, the processing proceeds to "YES", and on-vehicle power supply device 6 operates in an emergency power supply mode similarly to the first exemplary embodiment (step E to step H). Furthermore, similarly to the first exemplary embodiment, according to the second exemplary embodiment, step I and step J may be performed.

In addition, in the present exemplary embodiment, too, controller 12 receives power for an operation from electricity storage 7 or discharge circuit 9 in the emergency power supply mode although not illustrated in FIG. 5.

The emergency power supply mode of on-vehicle power supply device 6 is the same as that of above-described first exemplary embodiment. Controller 12 causes charge circuit 8 to stop charging electricity storage 7, makes an output instruction voltage to discharge circuit 9 the first voltage value (step E), and causes discharge circuit 9 to start discharging power of electricity storage 7. Furthermore, when output power W1 becomes larger than power threshold Wt, controller 12 lowers the output instruction voltage to discharge circuit 9 from the first voltage value to the second voltage value (step H).

Similarly to the first exemplary embodiment, on-vehicle power supply device 6 according to the present exemplary embodiment can more accurately decide whether or not the anomaly state of vehicle 14 occurs. As a result, on-vehicle power supply device 6 can operate in the emergency power supply mode at a necessary timing.

As illustrated in FIG. 5, collision signal receiver 20 is connected with collision detector 21 disposed in vehicle body 15. Therefore, when vehicle 14 encounters an accident, a collision signal is transmitted from collision detector 21 to controller 12 via collision signal receiver 20. In addition, although collision signal receiver 20 and controller 12 indicate individual components for ease of description, collision signal receiver 20 may be included in controller 12.

The present exemplary embodiment does not describe a normal mode of on-vehicle power supply device 6 in particular. However, when controller 12 detects that the input voltage is higher than the input lower limit voltage and controller 12 does not detect reception of the collision signal via collision signal receiver 20, on-vehicle power supply device 6 operates in the normal mode.

In addition, in a case where on-vehicle power supply device 6 is caused to operate in the emergency power supply mode in the second exemplary embodiment, too, similarly to the first exemplary embodiment described with reference to FIG. 4, when output power W1 becomes higher than power threshold Wt (step G), controller 12 causes discharge circuit 9 to lower output instruction voltage V3 from the first voltage value to the second voltage value.

Figure 3C:
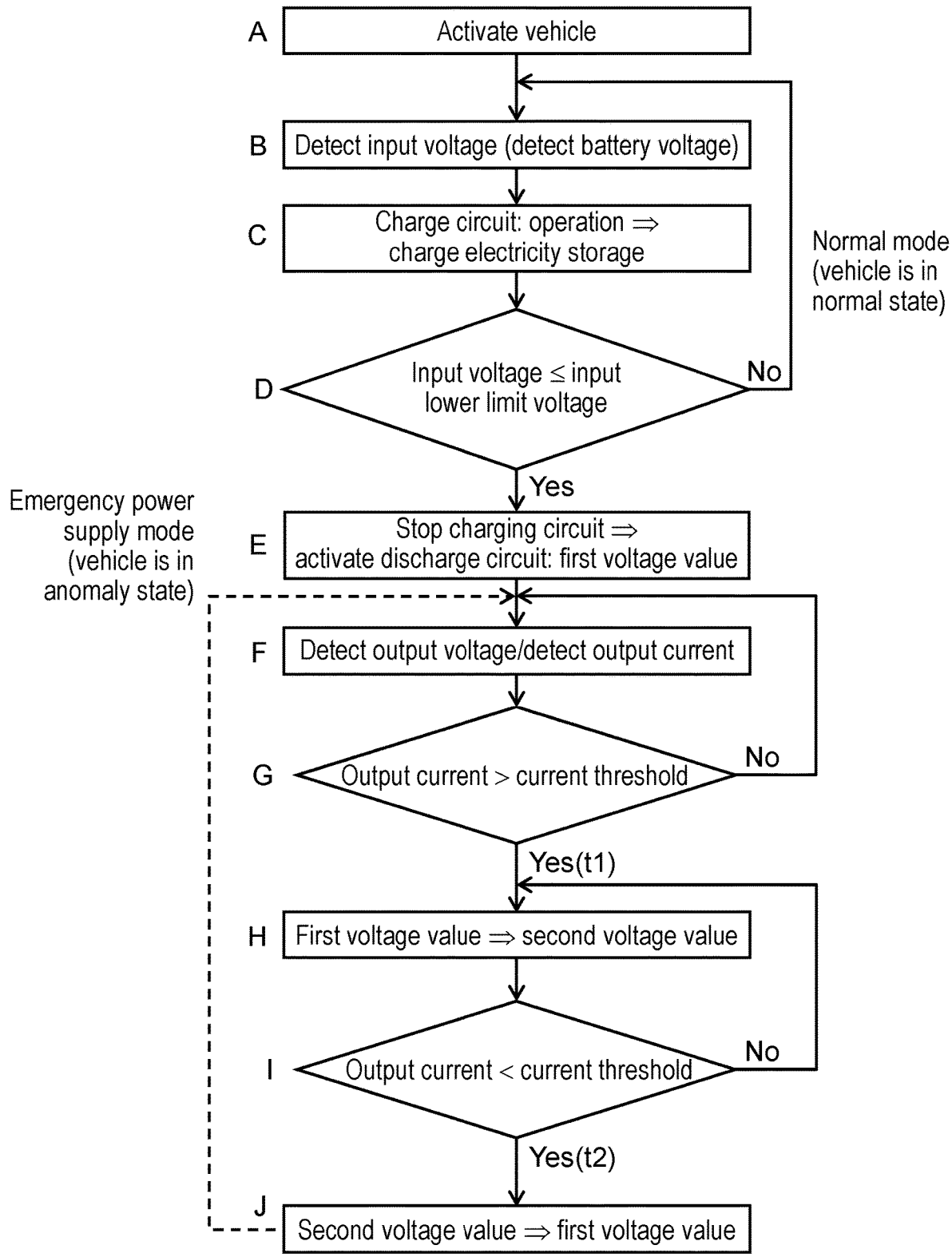
FIG. 3C is a flowchart for explaining an operation of an on-vehicle power supply device according to an exemplary embodiment of the present disclosure.
Figure 3D:
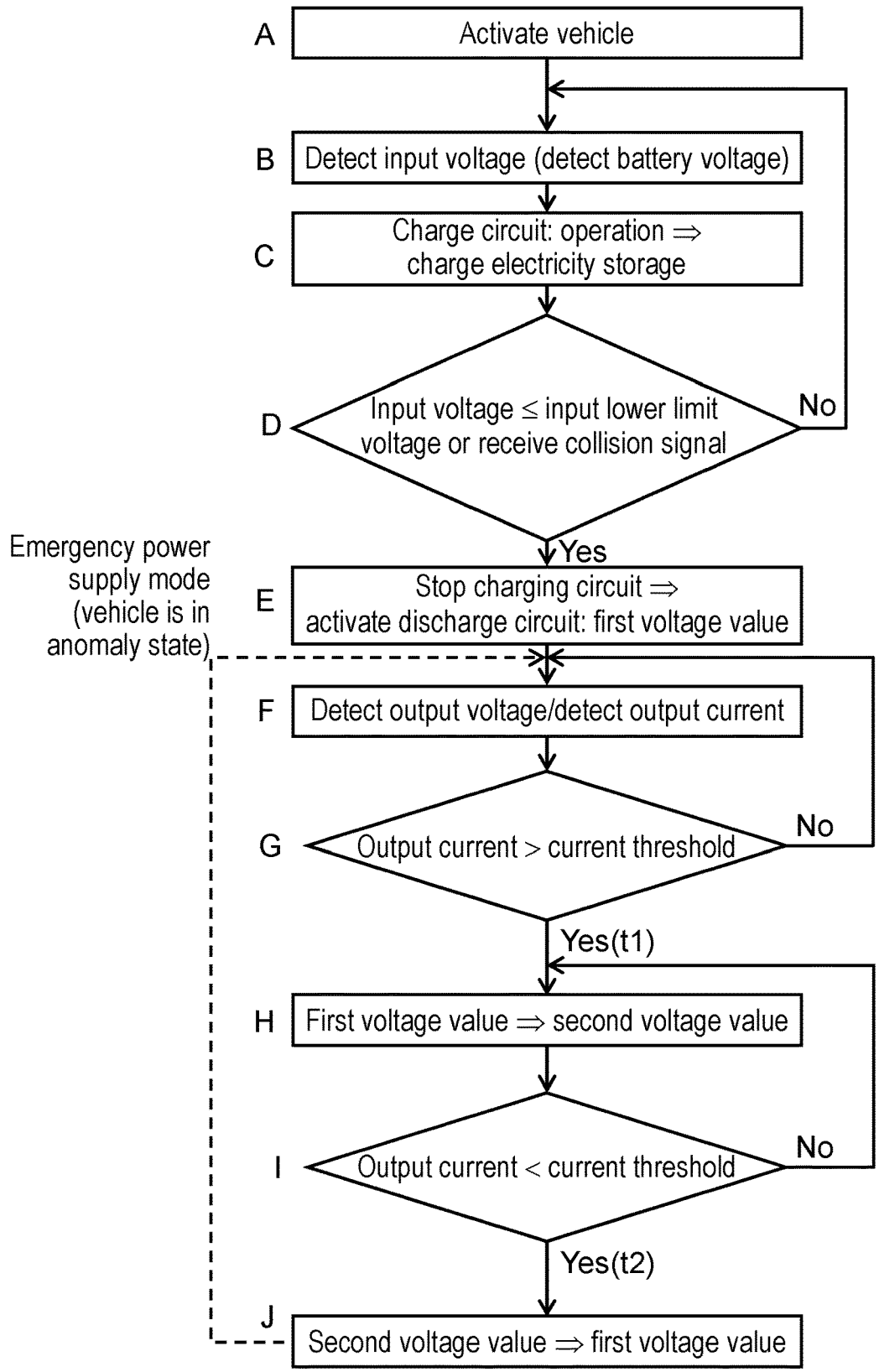
FIG. 3D is a flowchart for explaining the operation of the on-vehicle power supply device according to the exemplary embodiment of the present disclosure.
Figure 6:
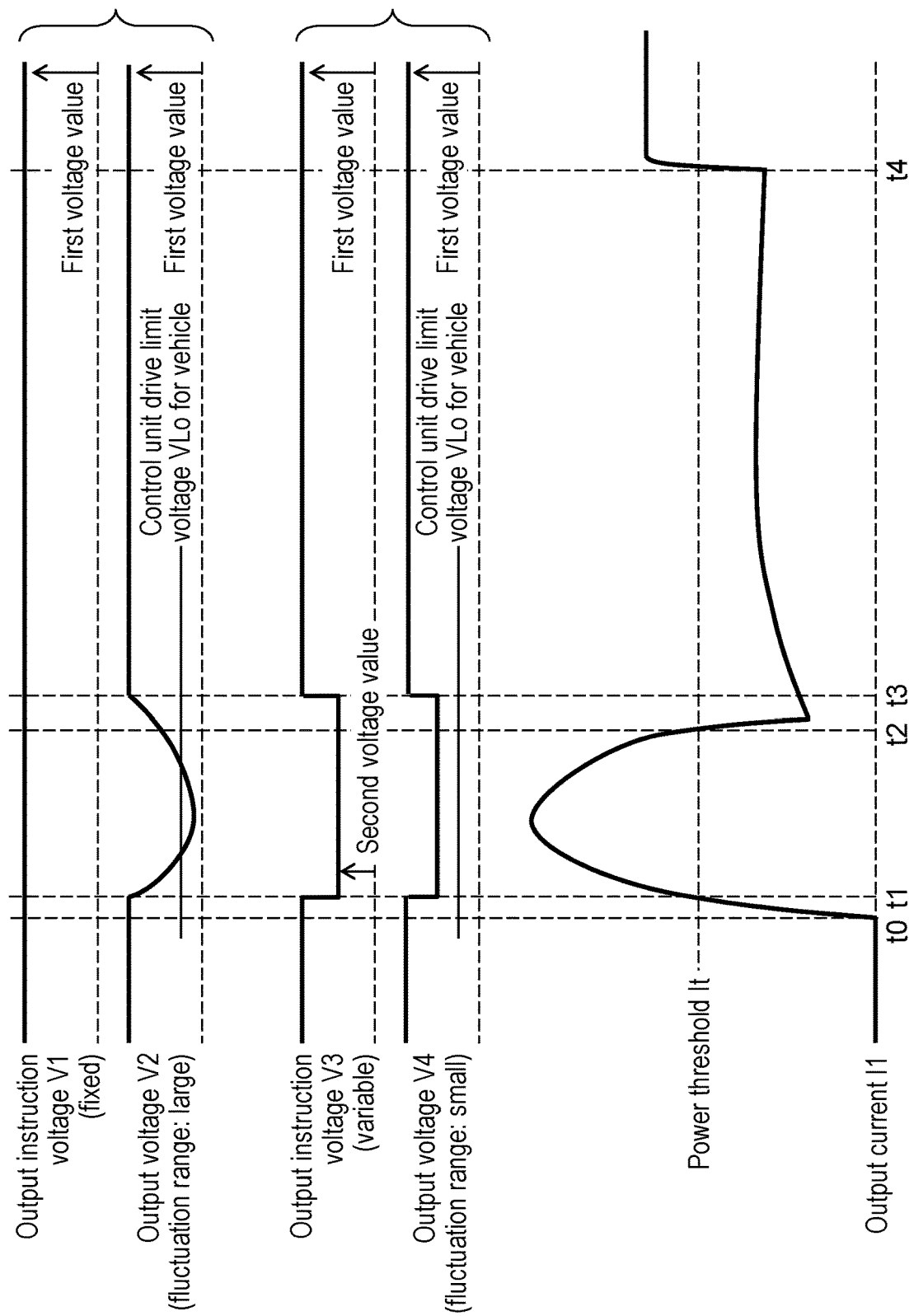
FIG. 6 is a timing chart for explaining the operation of the on-vehicle power supply device according to the second exemplary embodiment of the present disclosure.

As indicated in a timing chart indicating an operation of the on-vehicle power supply device in FIG. 6, a timing at which the output instruction voltage to discharge circuit 9 is lowered from the first voltage value to the second voltage value is decided by comparing the output power and the power threshold as indicated in step G in FIGS. 3A and 3B. However, as indicated in step G in FIGS. 3C and 3D, the timing may be decided by comparing output current I1 and current threshold It. In other words, all exemplary embodiments of the present disclosure including a third exemplary embodiment described below, the output current may be used for the output power, and the current threshold may be used for the power threshold.

Similarly to above FIG. 4, it will be assumed and stated that load 13 illustrated in FIG. 6 is an electric motor. In this case, it is assumed that discharge circuit 9 starts supplying power to load 13 at a timing of t0 to activate load 13. The current starts flowing to load 13 at the timing of t0. Between t0 and t2 and before the operation of load 13 enters a stationary state (the electric motor receives a supply of power and then starts rotating at a constant speed), a large current (indicated as output current I1 in FIG. 6) temporarily flows to load 13. However, the output voltage does not start lowering at the timing of t0.

In other words, output voltage V4 starts lowering when power which can be supplied from electricity storage 7 and discharge circuit 9 to load 13 reaches a limit. That is, output voltage V4 does not immediately start lowering when output current I1 flows, but starts at a timing of t1 which is a timing at which output current I1 is more than or equal to current threshold It. Consequently, controller 12 can accurately decide whether or not to cause discharge circuit 9 to lower output instruction voltage V3 from the first voltage value to the second voltage value based on output current I1 and current threshold It.

Third Exemplary Embodiment

Next, another control method of controller 12 for output instruction voltage V3 will be described with reference to FIG. 7.

In the first exemplary embodiment or the second exemplary embodiment, according to an operation in an emergency power supply mode of on-vehicle power supply device 6, when output power W1 becomes larger than power threshold Wt or output current I1 becomes larger than current threshold It ("Yes" in step G), controller 12 lowers output instruction voltage V3 to discharge circuit 9 from the first voltage value to the second voltage value (step H).

Figure 7:
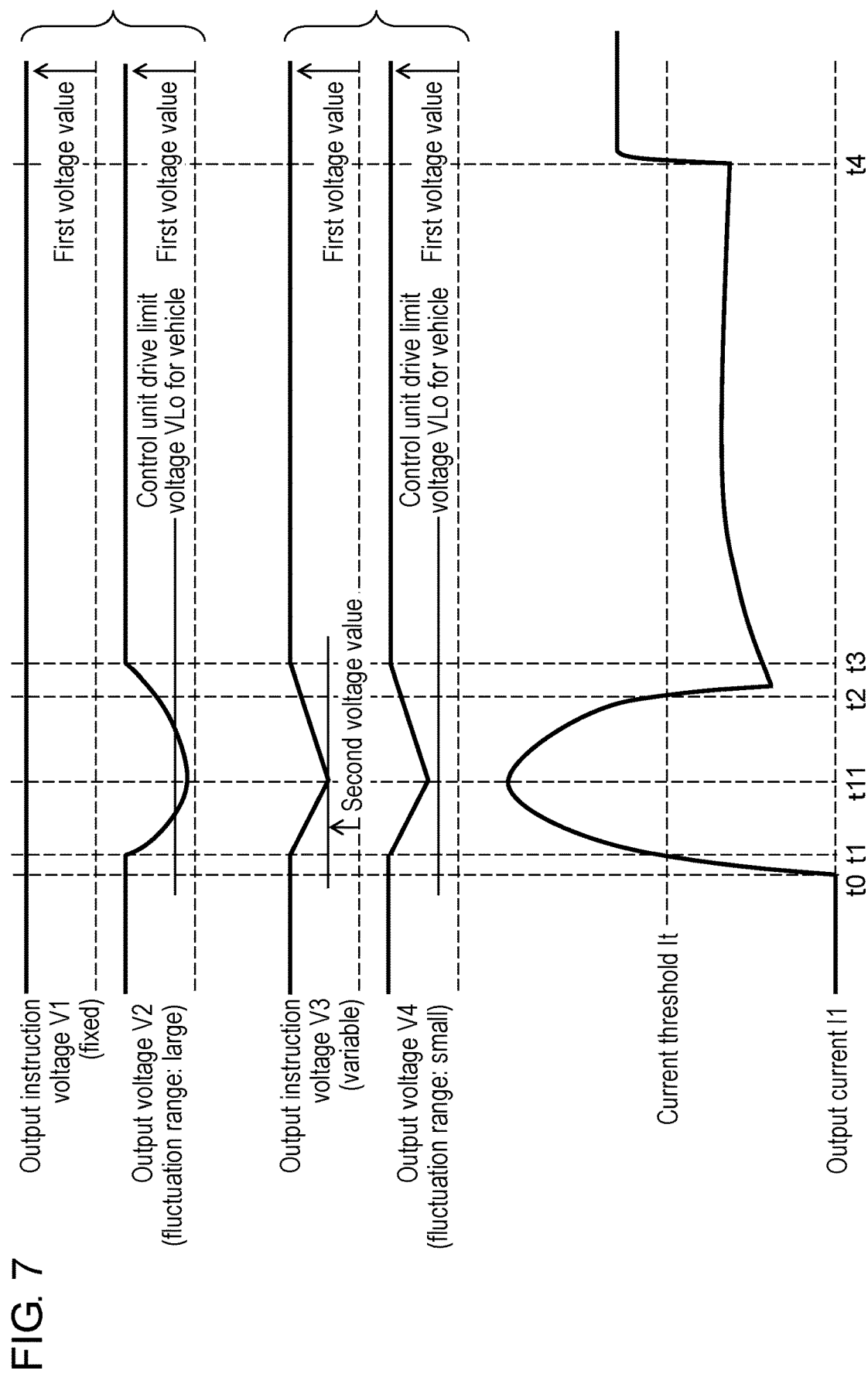
FIG. 7 is a flowchart illustrating the operation of the on-vehicle power supply device according to the third exemplary embodiment of the present disclosure.

On the other hand, in the present exemplary embodiment, when output current I1 becomes larger than current threshold It in the emergency power supply mode as illustrated in FIG. 7, controller 12 performs control for causing discharge circuit 9 to sequentially lower the output instruction voltage continuously or stepwise from the first voltage value to the second voltage value according to a value of the output current.

In addition, output current I1 and current threshold It have been used and described. However, output power W1 and power threshold Wt may be used instead of output current I1 and current threshold It for decision in step G similarly to FIG. 3A.

As indicated by a timing chart in FIG. 7, controller 12 performs control for causing discharge circuit 9 to gradually decrease the output instruction voltage to the second voltage value at t11 of a timing at which output current I1 maximizes. Consequently, while output voltage V4 to be actually detected gradually decreases substantially in synchronization with output instruction voltage V3, it is possible to shorten a period in which the output voltage to be detected becomes close to limit voltage VLo. As a result, output voltage V4 from discharge circuit 9 becomes higher than limit voltage VLo. Consequently, discharge circuit 9 can stably supply a drive voltage to control unit 19 and controller 12.

Fourth Exemplary Embodiment

Next, vehicle 14 on which on-vehicle power supply device 6 is mounted according to the fourth exemplary embodiment of the present disclosure will be described with reference to FIG. 8.

Figure 8:
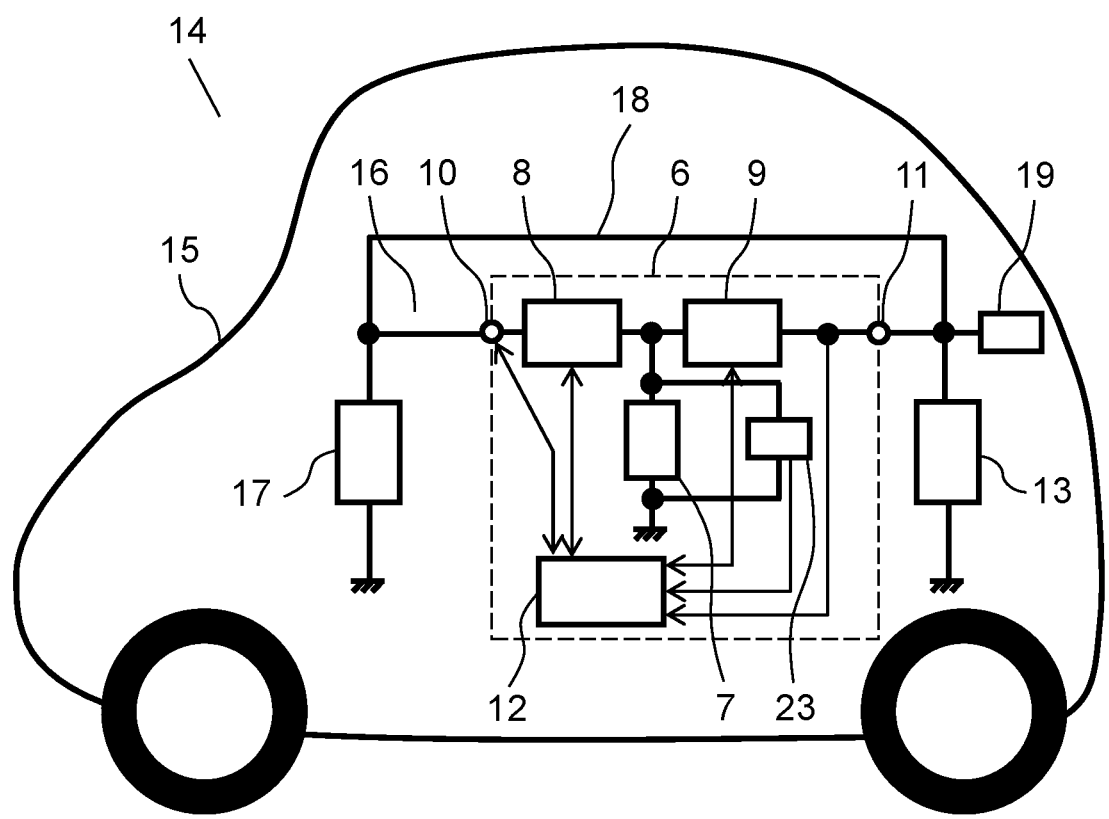
FIG. 8 is a block diagram illustrating a configuration of a vehicle on which the on-vehicle power supply device according to a fourth exemplary embodiment of the present disclosure is mounted.

A difference between configurations of vehicle 14 illustrated in FIG. 8 and vehicle 14 illustrated in FIG. 3 is that on-vehicle power supply device 6 illustrated in FIG. 8 further includes residual detector 23 which detects a residual electricity storage amount of electricity storage 7. The other components are the same, and therefore will be assigned the same reference signs, and description of the components will be omitted.

Residual detector 23 can detect the residual electricity storage amount of electricity storage 7, and a detection result is input to controller 12. Furthermore, controller 12 determines a value of power threshold Wt based on the residual electricity storage amount input from residual detector 23.

According to this configuration, when the residual electricity storage amount of electricity storage 7 lowers, power which can be supplied from discharge circuit 9 to load 13 also lowers. However, discharge circuit 9 is controlled by controller 12 to output power corresponding to the residual electricity storage amount of electricity storage 7, so that on-vehicle power supply device 6 can stably supply power.

In the above exemplary embodiments, in a case where controller 12 operates on-vehicle power supply device 6 in an emergency power supply mode, when output power W1 of output current I1 and output voltage V4 becomes larger than power threshold Wt, controller 12 performs control for causing discharge circuit 9 to lower output instruction voltage V3 from the first voltage value to the second voltage value. In addition, when output current I1 becomes larger than current threshold It, controller 12 may perform control for causing discharge circuit 9 to lower output instruction voltage V3 from the first voltage value to the second voltage value.

In addition, a timing at which controller 12 lowers output instruction voltage V3 in the above exemplary embodiments may be determined as t1 illustrated in FIG. 4 in association with power threshold Wt and current threshold It.

In addition, controller 12 may lower output instruction voltage V3, set an upper limit value to output current I1 and operate on-vehicle power supply device 6 in the emergency power supply mode. Naturally, when the upper limit value set to output current I1 is a value at which an electric motor can start rotating at above output instruction voltage V3, i.e., a value larger than a value at which load 13 can operate when load 13 is the electric motor.

One example will be described by using a specific value. It is assumed that, in a case where controller 12 operates on-vehicle power supply device 6 in the emergency power supply mode, on-vehicle power supply device 6 has capability which can output power of 200 W at the current of 20 A and the voltage of 10 V when electricity storage 7 is fully charged. In this regard, irrespective of whether or not electricity storage 7 is fully charged, when output power W1 is more than or equal to power threshold Wt, output power of on-vehicle power supply device 6 is lowered to 80 W. That is, charge circuit 8 may be controlled by controller 12 to send an output at the current of 10 A and the voltage of 8 V. 8 V which is the output voltage may be the output instruction voltage of controller 12. That is, at a timing of t1 at which output power W1 illustrated in FIG. 4 is more than or equal to power threshold Wt, controller 12 lowers output instruction voltage V3, and controller 12 further suppresses output current I1 to less than or equal to the upper limit value.

Consequently, when controller 12 lowers output instruction voltage V3, power supplied from electricity storage 7 to discharge circuit 9 is also suppressed. As illustrated in FIG. 1, internal resistance R is provided inside electricity storage 7. Hence, as power supplied from electricity storage 7 to discharge circuit 9 lowers, the current flowing to electricity storage 7 also lowers, and the voltage drop caused by internal resistance R also inevitably lowers. As a result, when output power W1 from on-vehicle power supply device 6 is lowered, loss inside electricity storage 7 also becomes little. Hence, although the voltage of electricity storage 7 is placed in a situation that the voltage of electricity storage 7 easily fluctuates at a timing of t3 from a timing of t1 illustrated in FIG. 4, the internal loss is suppressed, so that the voltage and the current supplied from electricity storage 7 and discharge circuit 9 stabilize.

Naturally, when controller 12 lowers output instruction voltage V3, output voltage V4 from discharge circuit 9 easily follows output instruction voltage V3 reliably. Furthermore, output voltage V4 of discharge circuit 9 easily maintains a higher voltage than limit voltage VLo.

Irrespective of whether electricity storage 7 is fully charged, output power W1 is more than or equal to power threshold Wt or output current I1 is more than or equal to current threshold It, on-vehicle power supply device 6 suppresses output power W1 or output current I1 to less than or equal to the upper limit value. On the other hand, when the residual electricity storage amount of electricity storage 7 lowers in particular, controller 12 may set output power W1 according to the residual electricity storage amount of electricity storage 7, and discharge circuit 9 may be controlled by controller 12 to output power set according to the residual electricity storage amount. Consequently, on-vehicle power supply device 6 can stably supply power with a little fluctuation in the emergency power supply mode.

Although not illustrated in FIG. 8, power for operating controller 12 is supplied from electricity storage 7 or discharge circuit 9 in the emergency power supply mode.

In addition, examples of load 13 according to the above exemplary embodiments include a motor which needs a temporarily large current during activation. Load 13 is, for example, a motor which operates to unlock a door, or a motor which operates to unlock a door latch.

For ease of description related to the above exemplary embodiments, controller 12 is described as the independent element. The function of controller 12 may be dispersed and implemented in electricity storage 7, discharge circuit 9, charge circuit 8, input unit 10 and output unit 11.

Conclusion

On-vehicle power supply device 6 according to the present disclosure includes: electricity storage 7; charge circuit 8 which is provided on a charging route of electricity storage 7, and charges electricity storage 7 with power; discharge circuit 9 which is provided on an output route of electricity storage 7, and discharges the power of electricity storage 7; input unit 10 which is connected with charge circuit 8; output unit 11 which is connected with discharge circuit 9; and controller 12 that detects an input voltage of input unit 10, an output current of output unit 11, and an output voltage of output unit 11, and controls charge circuit 8 and discharge circuit 9, and, when controller 12 decides that an emergency operation condition is satisfied, controllers 12 causes the charge circuit 8 to stop charging power to electricity storage 7, then sets output instruction voltage V3 which is a target voltage value of an output of discharge circuit 9 to a first voltage value, controller 12 further causes discharge circuit 9 to discharges the power charged in electricity storage 7, and, when the power output from discharge circuit 9 is higher than power threshold Wt, the controller lowers output instruction voltage V3 from a first voltage value to a second voltage value.

According to on-vehicle power supply device 6 according to the above present disclosure, when controller 12 detects that the input voltage has become lower than an input lower limit voltage, the emergency operation condition may be satisfied.

On-vehicle power supply device 6 according to the present disclosure of the above present disclosure may further include collision signal receiver 20 which is connected with controller 12 and receives a collision signal, and, when collision signal receiver 20 receives the collision signal, the emergency operation condition may be satisfied.

On-vehicle power supply device 6 according to the above present disclosure may further increase output instruction voltage V3 from the second voltage value to the first voltage value when the power output from discharge circuit 9 becomes higher than power threshold Wt and then becomes lower than power threshold Wt again.

As described with reference to FIG. 6, on-vehicle power supply device 6 according to the above present disclosure may compare the power output from discharge circuit 9 and power threshold Wt by using a current value.

As described with reference to FIG. 7, according to on-vehicle power supply device 6 according to the above present disclosure, when lowering output instruction voltage V3 from the first voltage value to the second voltage value, controller 12 may lower output instruction voltage V3 from the first voltage value to the second voltage value continuously or stepwise.

As described with reference to FIG. 8, on-vehicle power supply device 6 according to the above present disclosure may further include residual detector 23 which detects a residual electricity storage amount of electricity storage 7, and power threshold Wt may be determined based on the residual electricity storage amount of electricity storage 7 detected by the residual detector 23.

Furthermore, on-vehicle power supply device 6 according to the present disclosure includes: electricity storage 7; charge circuit 8 which is provided on a charging route of electricity storage 7, and charges electricity storage 7 with power; discharge circuit 9 which is provided on an output route of electricity storage 7, and discharges the power of electricity storage 7; input unit 10 which is connected with charge circuit 8; output unit 11 which is connected with discharge circuit 9; and controller 12 that detects an input voltage of input unit 10, an output current of output unit 11, and an output voltage of output unit 11, and controls charge circuit 8 and discharge circuit 9, and, when controller 12 decides that an emergency operation condition is satisfied, charge circuit 8 stops charging of electricity storage 7, then discharge circuit 9 discharges the power at a first voltage, controller 12 further causes discharge circuit 9 to discharge the power charged in electricity storage 7, and, when the power output from discharge circuit 9 becomes higher than power threshold Wt, discharge circuit 9 discharges the power at a second voltage value smaller than the first voltage value.

Vehicle 14 according to the present disclosure includes: on-vehicle power supply device 6 according to one of the above; vehicle body 15 on which on-vehicle power supply device 6 is mounted; and vehicle battery 17 which is mounted on vehicle body 15 and supplies power to on-vehicle power supply device 6.

According to the present disclosure, the on-vehicle power supply device lowers the output instruction voltage by a predetermined value when large output power is necessary in, for example, the emergency power supply mode in particular. Consequently, temporary pulsation of an output voltage which occurs as the output power reaches a supply limit, in other words, temporary pulsation of an output voltage which occurs due to an influence from the load is suppressed. Consequently, a significant fluctuation of a output voltage is alleviated. Consequently, the on-vehicle power supply device can output a stable voltage without additionally providing an auxiliary electricity storage element. As a result, the on-vehicle power supply device can stably operate, and realize miniaturization at the same time.

INDUSTRIAL APPLICABILITY

The on-vehicle power supply device according to the present disclosure provides an effect that it is possible to perform a stable operation and realize miniaturization at the same time, and is useful for various electronic devices.

REFERENCE MARKS IN THE DRAWINGS 1, 6: on-vehicle power supply device
2, 13: load
3: electricity storage element
4: auxiliary electricity storage element
5: switch unit
7: electricity storage
8: charge circuit
9: discharge circuit
10: input unit
11: output unit
12: controller
14: vehicle
15: vehicle body
16: switch
17: vehicle battery
18: power transmission line
19: control unit
20: collision signal receiver
21: collision detector
23: residual detector
30: output unit
I1: output current
It: current threshold
V1, V3: output instruction voltage
V2, V4: output voltage
VLo: limit voltage
W1: output power
Wt: power threshold

The invention claimed is:
1. An on-vehicle power supply device comprising:
an electricity storage;
a charge circuit that is provided on a charging route of the electricity storage, and charges the electricity storage with power;
a discharge circuit that is provided on an output route of the electricity storage, and discharges the power of the electricity storage;
an input unit that is connected with the charge circuit;
an output unit that is connected with the discharge circuit; and
a controller that detects an input voltage of the input unit, an output current of the output unit, and an output voltage of the output unit, and controls the charge circuit and the discharge circuit, wherein
when the controller decides that an emergency operation condition is satisfied, the controllers causes the charge circuit to stop charging the power to the electricity storage, then sets an output instruction voltage that is a target voltage value of an output of the discharge circuit to a first voltage value,
the controller further causes the discharge circuit to discharge the power charged in the electricity storage, and, when the power output from the discharge circuit becomes higher than a power threshold, the controller lowers the output instruction voltage from the first voltage value to a second voltage value.

2. The on-vehicle power supply device according to claim 1, wherein, when the controller detects that the input voltage has become lower than an input lower limit voltage, the emergency operation condition is satisfied.

3. The on-vehicle power supply device according to claim 1, further comprising a receiver that is connected with the controller and receives a collision signal,
wherein, when the receiver receives the collision signal, the emergency operation condition is satisfied.

4. The on-vehicle power supply device according to claim 1, wherein, when the power output from the discharge circuit becomes higher than the power threshold and then becomes lower than the power threshold again, the output instruction voltage is increased from the second voltage value to the first voltage value.

5. The on-vehicle power supply device according to claim 1, wherein the power output from the discharge circuit and the power threshold are compared by using a current value.

6. The on-vehicle power supply device according to claim 1, wherein, when lowering the output instruction voltage from the first voltage value to the second voltage value, the controller lowers the output instruction voltage from the first voltage value to the second voltage value continuously or stepwise.

7. The on-vehicle power supply device according to claim 1, further comprising a residual detector that detects a residual electricity storage amount of the electricity storage,
wherein the power threshold is determined based on the residual electricity storage amount of the electricity storage detected by the residual detector.

8. An on-vehicle power supply device comprising:
an electricity storage;
a charge circuit that is provided on a charging route of the electricity storage, and charges the electricity storage with power;
a discharge circuit that is provided on an output route of the electricity storage, and discharges the power of the electricity storage;
an input unit that is connected with the charge circuit;
an output unit that is connected with the discharge circuit; and
a controller that detects an input voltage of the input unit, an output current of the output unit, and an output voltage of the output unit, and controls the charge circuit and the discharge circuit, wherein
when the controller decides that an emergency operation condition is satisfied, the charge circuit stops charging of the electricity storage, then the discharge circuit discharges the power at a first voltage value,
the controller further causes the discharge circuit to discharge the power charged in the electricity storage, and,
when the power output from the discharge circuit becomes higher than a power threshold, the discharge circuit discharges the power at a second voltage value smaller than the first voltage value.

9. A vehicle comprising:
the on-vehicle power supply device according to claim 1;
a vehicle body on which the on-vehicle power supply device is mounted; and
a vehicle battery that is mounted on the vehicle body and supplies power to the on-vehicle power supply device.

* * * * *